United States Patent
Kim

(10) Patent No.: US 6,336,218 B1
(45) Date of Patent: Jan. 1, 2002

(54) METHOD OF CONTROLLING RESERVATION PROGRAM BY USING SETTOP BOX AND THE SETTOP BOX

(75) Inventor: Sung-Doug Kim, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/253,059

(22) Filed: Feb. 19, 1999

(30) Foreign Application Priority Data

Feb. 26, 1998 (KR) .............................................. 98-6208

(51) Int. Cl.[7] .............................................. H04N 5/445
(52) U.S. Cl. .......................................... 725/58; 725/38
(58) Field of Search ................................. 348/731, 730, 348/6, 7, 10, 460, 553; 455/4.2; 345/327; 709/219; 725/58, 38

(56) References Cited

U.S. PATENT DOCUMENTS 5,477,262 A * 12/1995 Banker et al. .................. 348/7
5,517,256 A * 5/1996 Hashimoto .................. 348/731
5,585,865 A * 12/1996 Amano et al. .............. 348/731
5,734,589 A * 3/1998 Kostreski et al. .............. 348/6
5,850,218 A * 12/1998 LaJoie et al. ................ 348/906

* cited by examiner

Primary Examiner—Victor R. Kostak
(74) Attorney, Agent, or Firm—Staas & Halsey LLP

(57) ABSTRACT

A method of controlling a television in which a reservation program is registered by a settop box, and the settop box. The method includes the steps of: detecting program guide information from a video signal received by the settop box in response to a user's request for a display of the program guide information, and displaying the program guide information on a monitor of a television connected to the settop box; checking a viewing time of the reservation program; if a present time is the viewing time of the reservation program, turning on the settop box; turning on the television by using communication ports of the settop box and the television; and displaying the reservation program received through the settop box on the television monitor.

47 Claims, 5 Drawing Sheets

METHOD OF CONTROLLING RESERVATION PROGRAM BY USING SETTOP BOX AND THE SETTOP BOX

CROSS-REFERENCE TO RELATED APPLICATIONS

This application claims the benefit of Korean Application No. 6208/1998, filed Feb. 26, 1998, in the Korean Patent Office.

BACKGROUND OF THE INVENTION

1. Field of the Invention

The present invention relates to a video-on-demand (VOD) system, and more particularly, to a method for controlling a television in which a reservation program is registered, by using a settop box, and the settop box.

2. Description of the Related Art

As standardization of MPEG-2 (Moving Picture Experts Group-2) comes to a conclusion, people now show a deep interest in MPEG-2 application services. Especially, experiments are conducted actively to put VOD services to practical use. Using the VOD services, the user can watch a desired program at a desired time by combining MPEG-2 with a computer network. For the MPEG-2 application services, not only technical study but also development in application products for film-on-demand, teleshopping, network games, news-on-demand, remote education systems, etc., are intensively being conducted. On the basis of this trend arising from 1993, DAVIC (Digital Audio Visual Council), which has made rapid progress in activities of standardization for bidirectional multimedia services, was established in March 1994.

The VOD services enable the user to watch a desired program at any time. The VOD services are applicable to a film, and educational or sports programs which are broadcast through a television (TV). For the VOD services, there are a content provider who is a producer of video information, an information provider, a user who is a consumer of the information, and a network provider for operating an information network between the information provider and the user.

Three main elements of a general VOD system are an application server 6, a network 8, and a settop box 10, as illustrated in FIG. 1 and applicable to the present invention. Video information contained in a recording medium 2, a video tape for example, provided by the content provider is supplied to the application server 6 by an input server 4. The application server 6 stores the video information and application software for controlling the video information and supplies them to a user device, for example, a settop box 10 or an indoor receiving device, according to a demand from the user. The application server 6 may be a cyberspace theater or a department amusement center. The network 8 should have a broadband network which can transmit information of a few Mbps-class so as to be used for distributing the video information, including a core network 8A, a node access 8B and an access network 8C. The core network 8A receives the video information from the application server 8 and transmits the same to the access 8B. The node access 8B connects the core network 8A to the access network 8B and enables transmission of information between the two, including the video information from the network 8A to the access network 8C. The access network 8A forwards commands from the user input at the settop box 10 to the node access 8B and the core network 8A, and then to the application server 8. In the access network 8C, various transmission media, such as an optical fiber, a coaxial cable, a spiral pair cable (telephone line) and a satellite, may be applied. The settop box 10 is installed in a house and serves as a termination of a broadband transmission path. The settop box 10 decodes the digital information of the application server 6 so as to be displayed on a TV monitor of a TV (shown in FIG. 2 as element 14), or supplies a command input by the user by means of a remote controller (RC) to the application server 6.

The TV 14 can be turned on or off by the settop box 10 connected thereto. The settop box 10 is also used to reserve a desired program.

FIG. 2 is a diagram illustrated to describe a control process for turning on the TV 14 by the settop box 10. Under a state that a reservation program is registered by the user, if it is a reservation program time, the settop box 10 is turned on, while the TV 14 is maintained at a turned-off state. To watch the reserved program, the user should check the reservation program time and control the settop box 10 by using a settop box remote controller so as to turn on the TV 14. By the control of the user, an infrared (IR) transmitter 12 of the settop box 10 transmits an IR signal corresponding to a TV on control signal to the TV 14. The TV 14 receives the IR signal through an IR receiver 16 therein and turns on its power.

Thus, there is a disadvantage in that the user can not watch the reservation program unless he or she manipulates the TV manually at the reservation program time. Further, the IR transmitter 12 of the settop box 10 requires an additional IR blaster wire to transmit the IR signal and the TV 14 should include the IR receiver 16, thereby causing inconvenience and a large cost.

SUMMARY OF THE INVENTION

It is therefore an object of the present invention to provide a method of automatically turning on a settop box and a TV at a reservation program time.

It is another object of the present invention to provide a method of controlling a power state of a TV in which a reservation program is registered.

Additional objects and advantages of the invention will be set forth in part in the description which follows and, in part, will be obvious from the description, or may be learned by practice of the invention.

To achieve the above objects of the present invention, there is provided a method of controlling a television using a settop box in which a reservation program is registered. The method includes the steps of: detecting program guide information from a video signal received by the settop box in response to a user's request for a display of the program guide information, and displaying the program guide information on a monitor of the television connected to the settop box; checking a viewing time of the reservation program; if a present time is the viewing time of the reservation program, turning on the settop box; turning on the television by using communication ports of the settop box and the television; and displaying the reservation program received through the settop box on a television monitor of the television.

BRIEF DESCRIPTION OF THE DRAWINGS

The above objects, features and advantages of the present invention will become more apparent from the following detailed description when taken in conjunction with the accompanying drawings, in which.

DESCRIPTION OF THE PREFERRED EMBODIMENT

Figure 1:
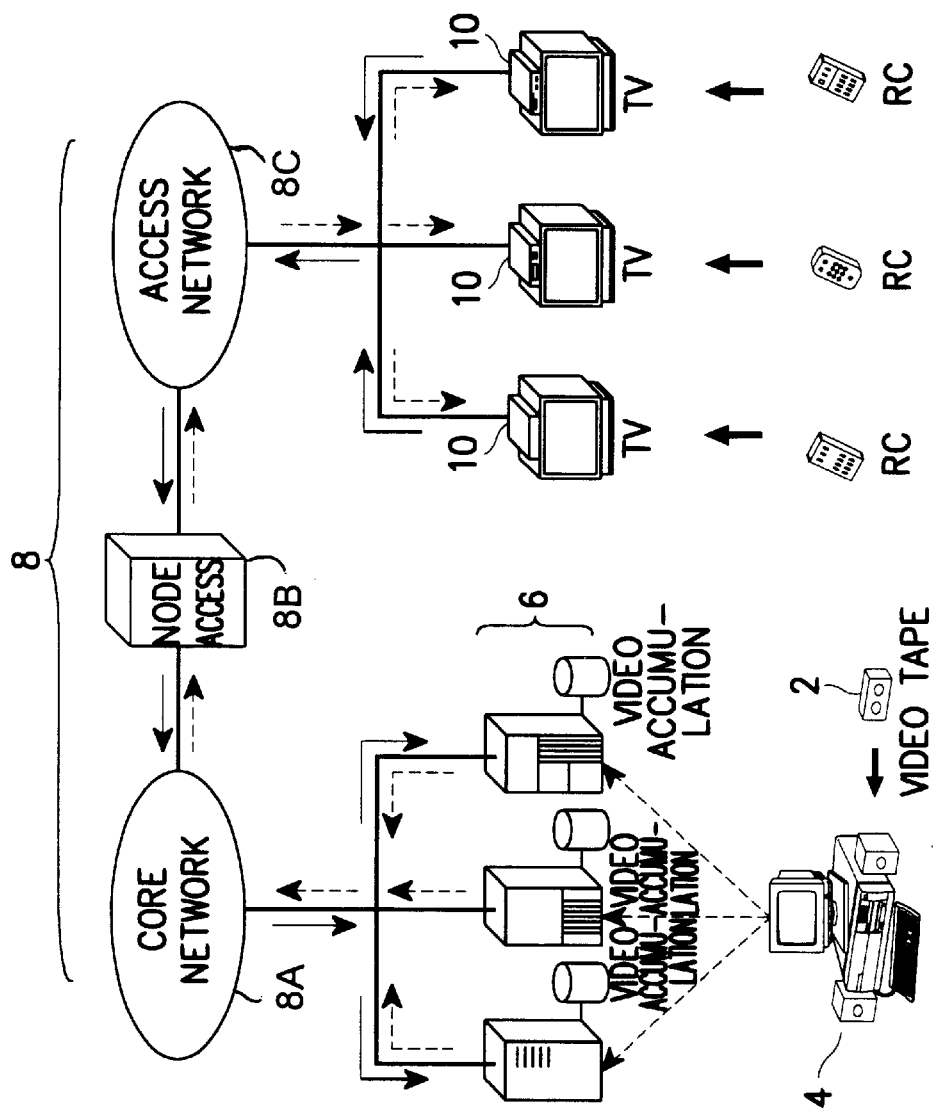
FIG. 1 illustrates a configuration of a general VOD system.
Figure 2:
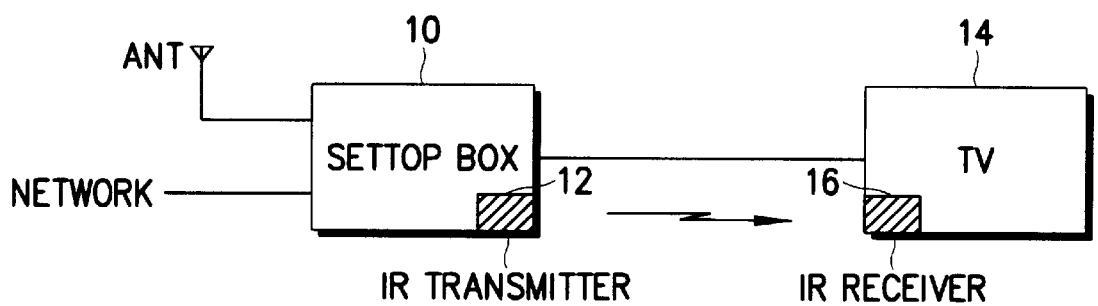
FIG. 2 is a diagram illustrated to describe a conventional control process for turning on a TV using a settop box.

A preferred embodiment of the present invention will be described hereinbelow with reference to the accompanying drawings. Like reference numerals designate like parts throughout the views. In the following description, well known functions or constructions are not described in detail so as not to obscure the subject matter of the present invention.

Figure 3:
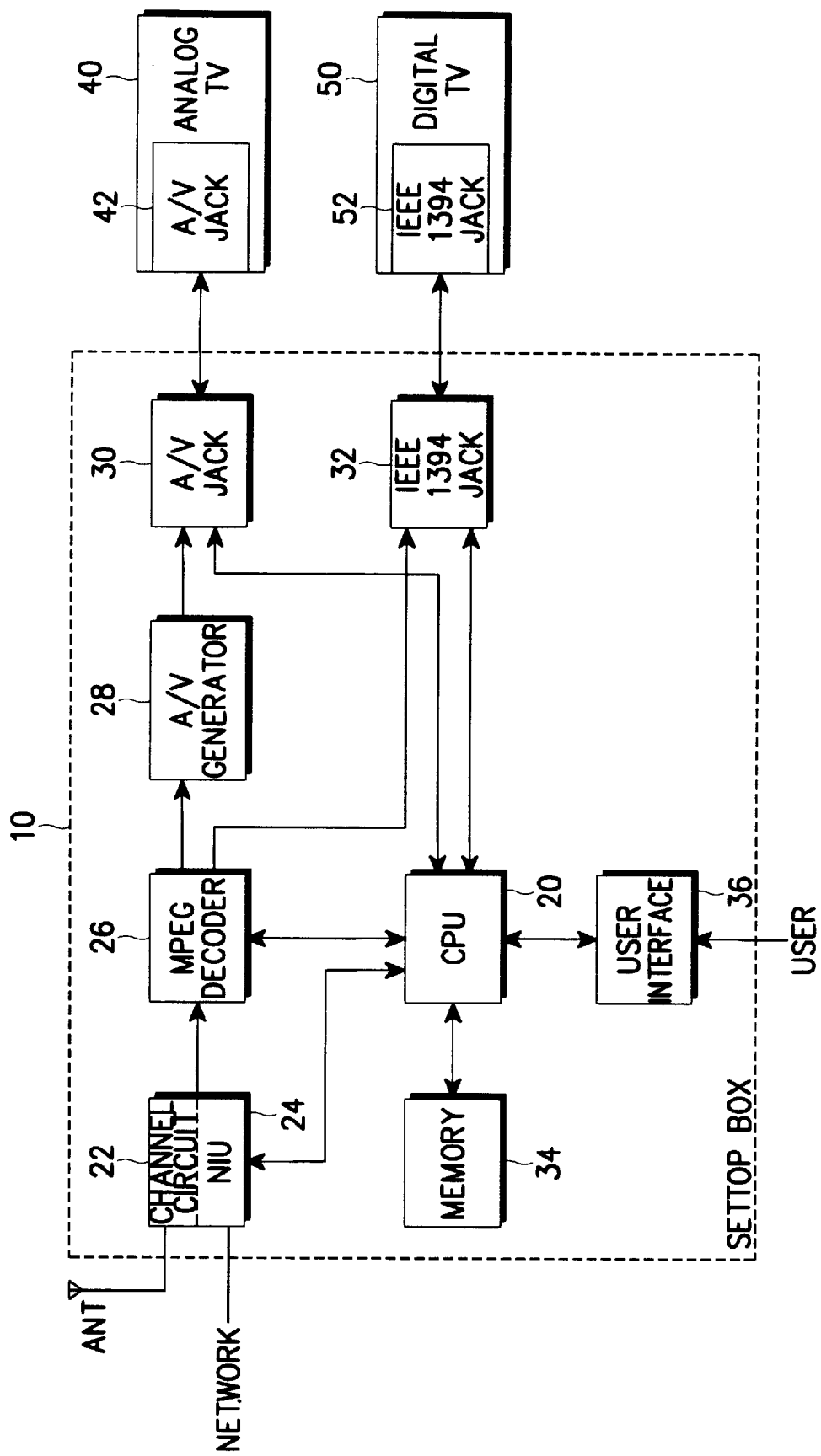
FIG. 3 is a block diagram of a settop box and an analog TV and a digital TV according to an embodiment of the present invention.

FIG. 3 is a block diagram of a settop box 10, an analog TV 40 and a digital TV 50. The settop box 10 is installed in a housing (not shown). The settop box 10 includes a central processing unit (CPU) 20, a channel circuit 22 connected to an antenna ANT, a network interface unit (NIU) 24, an MPEG decoder 26, an audio/video (A/V) generator 28, an audio/video (A/V) jack 30, an IEEE 1394 jack 32, a memory 34, and a user interface 36. The CPU 20 controls the overall operation of the settop box 10. The memory 34 includes a read only memory (ROM) and a random access memory (RAM). The ROM stores various control programs of the CPU 20. The RAM is controlled by the CPU 20 and stores data. The user interface 36 has a plurality of keys, a remote controller, and a front display and causes the CPU 20 to interface with the user. The channel circuit 22 tunes a channel when a broadcasting signal is received through the antenna ANT. The NIU 24 is connected to a network through a transmission medium such as a telephone line or an optical cable, and interfaces transmitting/receiving data between the network and the MPEG decoder 26. The MPEG decoder 26 controlled by the CPU 20 decodes an MPEG data stream supplied from the NIU 24 or the channel circuit 22 and generates the decoded MPEG data stream as digital audio and video data. The A/V generator 28 converts the digital audio and video data processed from the MPEG decoder 26 into analog audio and video signals and supplies the analog audio and video signals to the analog TV 40 through the A/V jack 30. The digital audio and video data decoded from the MPEG decoder 26 is also supplied to the digital TV 50 through the IEEE 1394 jack 32. The analog TV 40 processes the audio and video signals received through an A/V jack 42 so that the user may watch the analog TV 40. The digital TV 50 digitally processes the audio and video signals received through an IEEE 1394 jack 52 so that the user may watch the digital TV 50.

Figure 4:
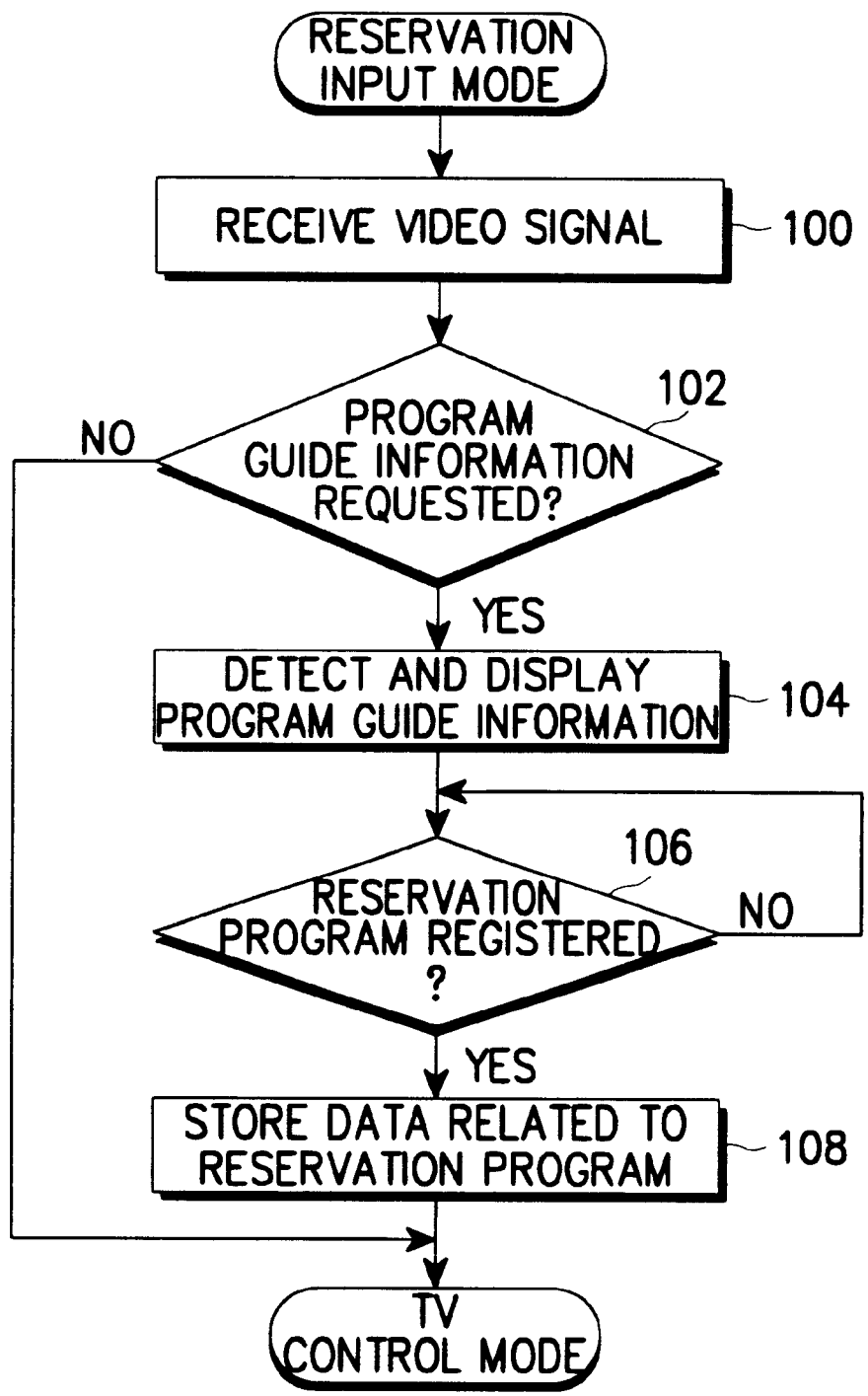
FIG. 4 is a flow chart illustrating an execution process of a reservation input mode performed by the settop box according to the embodiment of the present invention.
Figure 5:
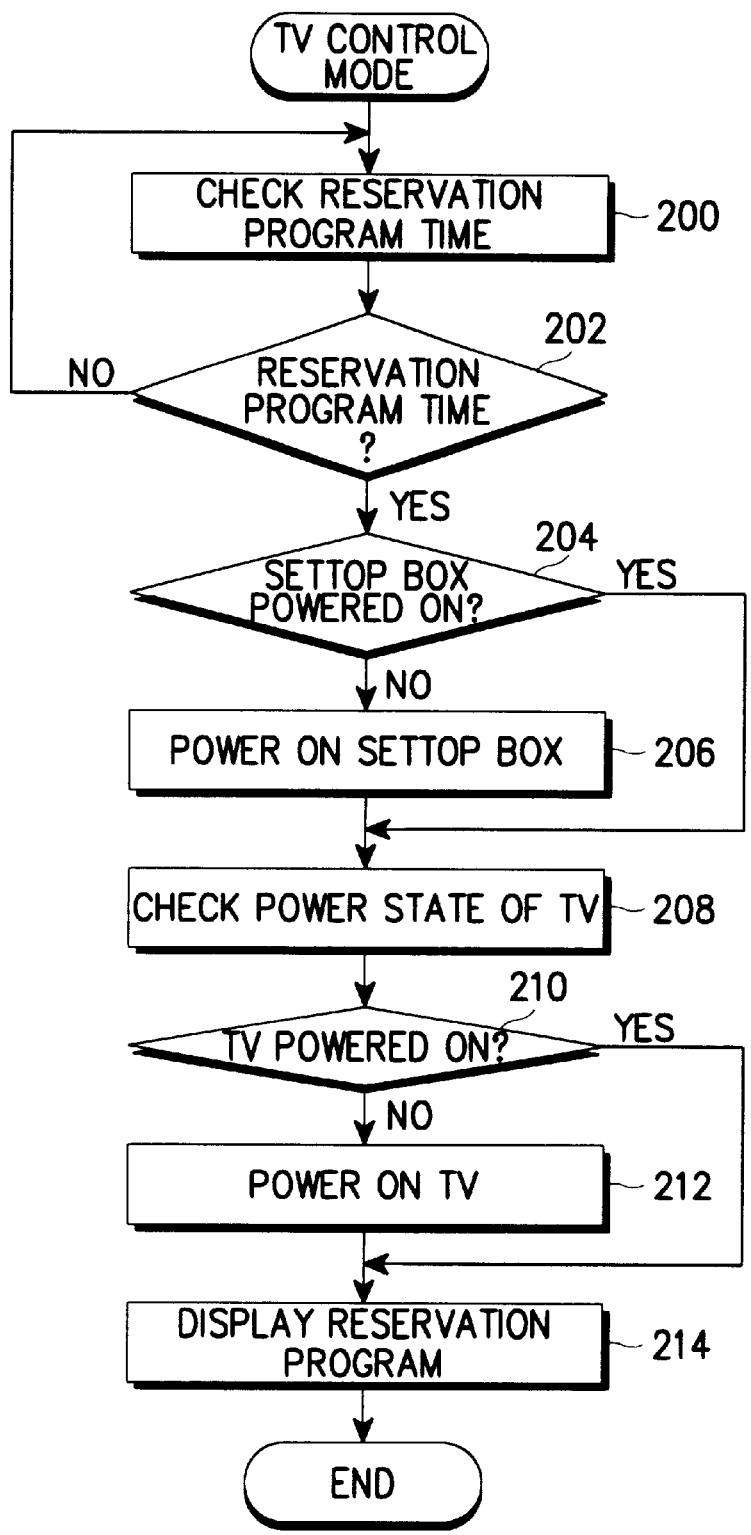
FIG. 5 is a flow chart illustrating an execution process of a TV control mode performed by the settop box according to the embodiment of the present invention.

FIG. 4 is a flow chart illustrating an execution process of a reservation input mode performed by the settop box 10, and FIG. 5 is a flow chart illustrating an execution process of a TV control mode performed by the settop box 10.

Referring to FIGS. 3 and 4, in the reservation input mode, the CPU 20 of the settop box 10 receives a video signal at step 100 and checks whether the user demands through the user interface 36 that program guide information be displayed at step 102. If so, the CPU 20 detects the program guide information from the received video signal and displays it on a monitor of the analog TV 40 or the digital TV 50.

Digital multichannel broadcasting provides several tens of or several hundred of channels. The viewer has many opportunities to select the channels but it is complicated to select the program. Such digital multichannel broadcasting offers as a basic service an electronic program guide (EPG) for providing a program table or information about the contents of each program. The EPG is an example of the program guide information. The program guide information such as the EPG includes a program channel number, a channel title, a program name, a time schedule, etc. The program table is displayed on the TV monitor of the analog TV 40 or the digital TV 50.

The CPU 20 checks whether the user registers a reservation program from the displayed program guide information at step 106. If the reservation program is registered, the CPU 20 stores a reservation program time and data related to the reservation program in the memory 34. If the reservation program is not registered, the CPU 20 repeats step 106.

If the reservation program time and data related to the reservation program are stored at step 108 shown in FIG. 4, the CPU 20 of the settop box 10 proceeds to the TV control mode. Referring to FIGS. 3 and 5, the CPU 20 checks the reservation program time at step 200. It is judged at step 202 whether a present time is the reservation program time. If so, the CPU 20 checks whether the settop box 10 is in a turned-on state at step 204, and if not, returns to step 200 to check the reservation program time. If the settop box 10 is not in a turned-on state, the CPU 20 turns on the settop box 10 at step 206. If the settop box 10 is turned on in step 206 or already turned on in step 204, the CPU 20 checks a power state of a corresponding TV (that is, the analog TV 40 or the digital TV 50) through the A/V jack 30 or the IEEE 1394 jack 32 at step 208. If the corresponding TV is in a turned-on state, a controller of the corresponding TV will respond to a check by the CPU 20 through the A/V jack 30 or the IEEE 1394 jack 32. The CPU 20 checks whether the corresponding TV is in a turned-on state at step 210. If the corresponding TV is not in a turned-on state, the CPU 20 turns on the corresponding TV through the A/V jack 30 or the IEEE 1394 jack 32 at step 212. If the corresponding TV is turned on in step 212 or already turned on in step 210, the CPU 20 displays the reservation program received from the settop box 10 on the TV monitor of the corresponding TV at step 214.

As described above, if a present time is the reservation program time, the settop box controls its power to be in an on state and turns on the corresponding TV through the A/V jack or the IEEE1394 jack. Therefore, the user can watch the reservation program at the reservation program time without manipulating the TV manually.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling a television using a settop box connected thereto comprising:

in response to a request by a user for a display of program guide information including information on programs to be broadcast on multiple channels, detecting the program guide information from a video signal received by the settop box and displaying the program guide information on a monitor of the television;

registering a reservation program as the program guide information is displayed;

if the reservation program has been registered, checking a viewing time of the reservation program;

if a present time is the viewing time of the reservation program, using the settop box
    to turn on the settop box to receive the reservation program, and
    to turn on the television using communication ports of the settop box and the television; and displaying the reservation program received through the settop box on the television monitor.

2. A method of controlling a television using a settop box connected thereto comprising:

in response to a request by a user for a display of program guide information, detecting the program guide information from a video signal received by the settop box and displaying the program guide information on a monitor of the television;

registering a reservation program;

if the reservation program has been registered, checking a viewing time of the reservation program;

if a present time is the viewing time of the reservation program, using the settop box
    to turn on the settop box to receive the reservation program,
    to check a power state of the television after turning on the settop box and prior to turning on the television, and
    turning on the television using communication ports of the settop box and the television; and displaying the reservation program received through the settop box on the television monitor.

3. The method as claimed in claim 1, further comprising storing data relating to the reservation program, including the viewing time, in the settop box.

4. A method of controlling a television using a settop box connected thereto comprising:

in response to a request by a user for a display of program guide information, detecting the program guide information from a video signal received by the settop box and displaying the program guide information on a monitor of the television;

registering a reservation program;

if the reservation program has been registered, checking a viewing time of the reservation program;

if a present time is the viewing time of the reservation program, using the settop box
    to check a power state of the settop box to receive the reservation program prior to turning on the settop box,
    to turn on the septop box, and
    turning on the television using communication ports of the settop box and the television; and displaying the reservation program received through the settop box on the television monitor.

5. A method of displaying a reservation program on a monitor of a television connected to a settop box, comprising:

displaying program guide information on the monitor, the program guide information including information on the reservation program and other programs to be broadcast on the same and other channels;

reserving the reservation program in advance of a program time of the reservation program using the settop box;

determining whether a present time is the program time of the reservation program using the settop box; and turning on the television to display the reservation program on the television monitor if the settop box determines the television is not on and if the present time is the program time.

6. A method of displaying a reservation program on a monitor of a television connected to a settop box, comprising:

reserving the reservation program in advance of a program time of the reservation program using the settop box;

determining whether a present time is the program time of the reservation program using the settop box;

using the settop box to check whether the television is on prior to turning on the television; and turning on the television to display the reservation program on the television monitor if the television is not on and if the present time is the program time.

7. The method as claimed in claim 5, further comprising turning the settop box to an on state to receive the reservation program and to transmit the reservation program to the television monitor if the settop box is not in the on state and if the present time is the program time.

8. The method as claimed in claim 7, wherein said turning said settop box to the on state is prior to turning on the television.

9. A method of displaying a reservation program on a monitor of a television connected to a settop box, comprising:

displaying program guide information on the monitor, the program guide information including information on the reservation program and other programs to be broadcast on the same and other channels;

reserving the reservation program in advance of a program time of the reservation program using the settop box;

determining whether a present time is the program time of the reservation program using the seftop box; and turning the settop box to an on state to receive the reservation program and transmit the reservation program to the television monitor if the settop box determines that the settop box is not in the on state and if the present time is the program time.

10. A settop box to reserve in advance a reservation program to be displayed on a television monitor of a television, comprising:

a processing unit to reserve the reservation program in advance of a program time of the reservation program in accordance with a command from a user as program guide information including information on programs to be broadcast on multiple channels is displayed on the television monitor; and a storage device to store the program time;
    wherein said processing unit compares a present time to the program time stored in said storage device, determines whether the television is on if the present time is the program time, turns on the television if the television is not on, and displays the reservation program on the television monitor.

11. A settop box to reserve in advance a reservation program to be displayed on a television monitor of a television, comprising:

a processing unit to reserve the reservation program in advance of a program time of the reservation program in accordance with a command from a user; and a storage device to store the program time;
wherein said processing unit;
compares a present time to the program time stored in said storage device, determines whether the television is on if the present time is the program time, turns on the television if the television is not on, and displays the reservation program on the television monitor, and
determines whether the settop box is in an on state so as to receive the reservation program and transmit the reservation program to the television monitor if the present time is the program time, and switches the settop box to the on state if the settop box is not in the on state.

12. The settop box as claimed in claim 10, further comprising a receiving unit to receive a video signal having program guide information, wherein said processing unit checks whether the user requests the program guide information be displayed on the television monitor, detects the program guide information from the video signal if the user requests the program guide information be displayed and displays the program guide information on the television monitor, to enable the user to issue the command to reserve the reservation program.

13. The settop box as claimed in claim 10, further comprising:
an MPEG decoder to decode the reservation program, which is in an MPEG data stream, as digital audio and video data;
an audio/visual generator to convert the digital audio and video data to analog audio and video data; and
a jack to transfer the analog audio and video data to the television if the television is an analog television.

14. The settop box as claimed in claim 10, further comprising:
an MPEG decoder to decode the reservation program, which is in an MPEG data stream, as digital audio and video data; and
a jack to transfer the digital audio and video data to the television if the television is a digital television.

15. The settop box as claimed in claim 10, further comprising:
an MPEG decoder to decode the reservation program, which is in an MPEG data stream, as digital audio and video data;
an audio/visual generator to convert the digital audio and video data to analog audio and video data;
a first jack to transfer the analog audio and video data to the television if the television is an analog television; and
a second jack to transfer the digital audio and video data to the television if the television is a digital television.

16. The settop box as claimed in claim 10, further comprising:
an antenna to receive first broadcasting signals;
a channel circuit to tune one of a first plurality of channels corresponding to the first broadcasting signals received by said antenna; and
a network interface unit connected to a network to interface between the network over a transmission medium, to selectively receive a second plurality of channels corresponding to second broadcasting signals transmitted over the network;
wherein the reservation program is in one of said first and second plurality of channels.

17. The settop box as claimed in claim 11, further comprising a user interface to receive the command from the user.

18. The settop box as claimed in claim 12, further comprising a user interface to receive the command from the user and the request from the user that the program guide information be displayed.

19. The settop box as claimed in claim 11, further comprising a receiving unit to receive a video signal having program guide information, wherein said processing unit checks whether the user requests the program guide information be displayed on the television monitor, detects the program guide information from the video signal if the user requests the program guide information be displayed and displays the program guide information on the television monitor, to enable the user to issue the command to reserve the reservation program.

20. The method as claimed in claim 1, further comprising checking a power state of the television after turning on the settop box and prior to turning on the television.

21. The method as claimed in claim 20, further comprising checking a power state of the settop box prior to turning on said settop box.

22. The method as claimed in claim 21, wherein said registering comprises determining the viewing time based on an input from a user, and relaying a command to an application server regarding the reservation program and the viewing time.

23. The method as claimed in claim 22, further comprising selecting the registration program from the program guide information based upon the input from the user.

24. The method as claimed in claim 1, wherein said registering comprises determining the viewing time based on an input from a user, and relaying a command to an application server regarding the reservation program and the viewing time.

25. The method as claimed in claim 8, further comprising checking whether the television is on prior to turning on the television.

26. The method as claimed in claim 25, further comprising checking whether the settop box is in the on state prior to turning the settop box to the on state.

27. The method as claimed in claim 5, wherein said reserving comprises determining the program time based on an input from a user, and relaying a command to an application server regarding the reservation program and the program time.

28. The method as claimed in claim 9, further comprising checking whether the settop box is in an on state prior to turning the settop box to the on state.

29. The method as claimed in claim 9, further comprising turning the television on to receive the reservation program transmitted from the settop box if the television is not on and if the present time is the program time.

30. The method as claimed in claim 29, further comprising checking whether the television is on prior to turning on the television.

31. The method as claimed in claim 9, wherein said reserving comprises determining the program time based on an input from a user, and relaying a command to an application server regarding the reservation program and the program time.

32. The settop box as claimed in claim 10, further comprising:
a network interface unit connected to a network to interface between the network over a transmission medium, to relay the command to an application server regarding the reservation program and the program time.

33. A video on demand system to allow a user to reserve in advance a reservation program to be displayed on a television monitor of a television, comprising:

an application server to store video programs, including the reservation program;

a settop box comprising processing unit to reserve the reservation program in advance of a program time of the reservation program in accordance with a command from a user as program guide information including information on programs to be broadcast on multiple channels is displayed on the television monitor, and a storage device to store the program time; and a network to connect said application server and said settop box;

wherein the processing unit compares a present time to the program time stored in the storage device, determines whether the television is on if the present time is the program time, turns on the television if the television is not on, receives the reservation program from said application server over said network, and displays the reservation program on the television monitor.

34. A video on demand system to allow a user to reserve in advance a reservation program to be displayed on a television monitor of a television, comprising:

an application server to store video programs, including the reservation program;

a settop box comprising a processing unit to reserve the reservation program in advance of a program time of the reservation program in accordance with a command from a user, and a storage device to store the program time; and a network to connect said application server and said settop box, wherein the processing unit compares a present time to the program time stored in the storage device, determines whether the television is on if the present time is the program time, turns on the television if the television is not on, receives the reservation program from said application server over said network, and displays the reservation program on the television monitor, and determines whether said settop box is in an on state so as to receive the reservation program and transmit the reservation program to the television monitor if the present time is the program time, and switches said settop box to the on state if said settop box is not in the on state.

35. The video on demand system as claimed in claim 33, wherein said settop box further comprises a receiving unit to receive a video signal having program guide information, wherein the processing unit checks whether the user requests the program guide information be displayed on the television monitor, detects the program guide information from the video signal if the user requests the program guide information be displayed and displays the program guide information on the television monitor, to enable the user to issue the command to reserve the reservation program.

36. The video on demand system as claimed in claim 33, wherein said settop box further comprises:

an MPEG decoder to decode the reservation program, which is in an MPEG data stream, as digital audio and video data;

an audio/visual generator to convert the digital audio and video data to analog audio and video data; and a jack to transfer the analog audio and video data to the television if the television is an analog television.

37. The video on demand system as claimed in claim 33, wherein said settop box further comprises:

an MPEG decoder to decode the reservation program, which is in an MPEG data stream, as digital audio and video data; and a jack to transfer the digital audio and video data to the television if the television is a digital television.

38. The video on demand system as claimed in claim 33, wherein said settop box further comprises:

an MPEG decoder to decode the reservation program, which is in an MPEG data stream, as digital audio and video data;

an audio/visual generator to convert the digital audio and video data to analog audio and video data;

a first jack to transfer the analog audio and video data to the television if the television is an analog television; and a second jack to transfer the digital audio and video data to the television if the television is a digital television.

39. The video on demand system as claimed in claim 33, wherein said settop box further comprises:

an antenna to receive first broadcasting signals;

a channel circuit to tune one of a first plurality of channels corresponding to the first broadcasting signals received by said antenna; and a network interface unit connected to said network to interface between said network over a transmission medium, to selectively receive a second plurality of channels corresponding to second broadcasting signals transmitted over said network;

wherein the reservation program is in one of said first and second plurality of channels.

40. The video on demand system as claimed in claim 34, wherein said settop box further comprises a user interface to receive the command from the user.

41. The video on demand system as claimed in claim 35, wherein said settop box further comprises a user interface to receive the command from the user and the request from the user that the program guide information be displayed.

42. The video on demand system as claimed in claim 34, wherein said settop box further comprises a receiving unit to receive a video signal having program guide information, wherein the processing unit checks whether the user requests the program guide information be displayed on the television monitor, detects the program guide information from the video signal if the user requests the program guide information be displayed and displays the program guide information on the television monitor, to enable the user to issue the command to reserve the reservation program.

43. The video on demand system as claimed in claim 33, wherein said settop box further comprises:

a network interface unit connected to said network to interface between said network over a transmission medium, to transmit the command to said application server regarding the reservation program and the program time over said network.

44. The method of claim 1, wherein one of the communication ports comprises an IEEE 1394 jack.

45. The method of claim 1, wherein one of the communication ports comprises an audio/video jack.

46. The method of claim 2, wherein one of the communication ports comprises an IEEE 1394 jack.

47. The method of claim 2, wherein one of the communication ports comprises am audio/video jack.

* * * * *